United States Patent
Chen et al.

(10) Patent No.: US 7,453,926 B2
(45) Date of Patent: Nov. 18, 2008

(54) BIT SYNCHRONIZATION DETECTION METHODS AND SYSTEMS

(75) Inventors: Chun-Nan Chen, Taipei (TW); Kun-Tso Chen, Fangyuan Township, Changhua County (TW)

(73) Assignee: Mediatek Incorporation, Hsin-Chu (TW)

( * ) Notice: Subject to any disclaimer, the term of this patent is extended or adjusted under 35 U.S.C. 154(b) by 668 days.

(21) Appl. No.: 11/141,903

(22) Filed: Jun. 1, 2005

(65) Prior Publication Data

US 2006/0274821 A1    Dec. 7, 2006

(51) Int. Cl.
   *H04B 1/00*    (2006.01)
(52) U.S. Cl. .................................. 375/149; 375/364
(58) Field of Classification Search ................ 375/145, 375/149, 326, 367, 355, 368, 364; 342/357.12, 342/357.15
   See application file for complete search history.

(56) References Cited

U.S. PATENT DOCUMENTS 5,999,577 A * 12/1999 Kawai ........................ 375/334
6,108,352 A * 8/2000 Sferrazza et al. ............. 370/503
6,714,158 B1 3/2004 Underbrink et al. ..... 342/357.12
6,738,364 B1 * 5/2004 Saunders ..................... 370/332

OTHER PUBLICATIONS

Global Positioning System: Theory and Applications vol. 1, pp. 395-396.
Bradford W. Parkinson, James J. Spilder, Jr.

* cited by examiner

*Primary Examiner*—Khanh C Tran
(74) *Attorney, Agent, or Firm*—Thomas, Kayden, Horstemeyer & Risley

(57) ABSTRACT

Methods and systems for detecting bit synchronization boundary in a received signal. A counter is set for defining a bit boundary of the received signal. Transitions in the received signal are detected and compared with the counter value as the transitions are expected to occur only at the bit boundary. The bit boundary is confirmed if a preset number of transitions aligned with the bit boundary.

23 Claims, 7 Drawing Sheets

BIT SYNCHRONIZATION DETECTION METHODS AND SYSTEMS

BACKGROUND

The invention relates to bit synchronization detection, and more specifically, to methods and systems for detection of bit synchronization boundary in Global Positioning System (GPS) signals.

GPS has provided many useful civilian applications such as automatic position reporting during emergencies, low-visibility harbor operations, navigation systems for drivers, hikers, and campers. GPS is a collection of earth-orbiting satellites, each satellite transmits a separate signal carrying information that allows GPS receivers to obtain good estimates of their position in real-time by locking onto at least three satellites. FIG. 1 illustrates transmission of an exemplary data bit according to the GPS standard. The GPS signal emitted by each satellite is modulated according to a unique Pseudo-Random Noise (PRN) code. A complete PRN code is composed of 1023 chips (bits), and the GPS signal is modulated with the PRN code that is repeated every millisecond (ms) as represented by label "1A" in FIG. 1. The receiver detects the GPS signal of a particular satellite by achieving a high correlation between the received signal and a shifted PRN code corresponding to the satellite. The receiver then uses the shifted PRN code to achieve synchronization with subsequent transmissions from the satellite.

GPS data bits are not protected by ordinary error correction algorithms such as inserting redundant bits, instead, each data bit is repeated twenty times for transmission. The period of the PRN code is 1 ms, so the period for transmitting one data bit is 20 ms after PRN code modulation. Label "1B" in FIG. 1 represents a time scale indicating epochs corresponding to the starting point of each 1023-chip represented by label "1A". Label "1C" represents a data bit that will be transmitted utilizing twenty PRN code periods. The actual transmission bit rate for GPS is therefore 50 bps. When a receiver detects a GPS signal, it attempts to synchronize the data bit in the signal by determining and aligning the bit boundaries. Bit boundary determination during signal acquisition determines the start of each 20 ms data bit period, and can improve receiver sensitivity to weak signals. The bit boundaries are known only to within some multiple of 1 ms PRN code periods.

An epoch counter that repeatedly counts from one to twenty (or zero to nineteen as represented by label "1B" in FIG. 1) without alignment is introduced in a conventional histogram approach for bit boundary determination. This histogram approach breaks each 20 ms data bit period into twenty 1 ms epoch periods, and senses sign changes or data bit transition between successive epochs. A corresponding counter out of twenty counters is incremented for each data bit transition sensed. After an appropriate interval, the bit boundary can be determined through voting between the twenty counters. Obtaining an adequate result with the histogram approach is, however, time-consuming. A time-consuming data bit demodulation will significantly increase TTFF (time to first fix), which is the most important performance evaluation parameter of a GPS receiver.

SUMMARY

An embodiment of a method for detecting bit synchronization boundary in a received signal comprises detecting polarity transitions in the received signal, initiating a counter to periodically count from 1 to M by incrementing the counter every PRN code period after detecting a first transition, and checking bit alignment by comparing actual time of a subsequent transition to expected time. The expected time is determined according to the counter output, and in some embodiments, the expected time is when the counter counts to M. If the bit alignment check fails, the counter begins counting from 1 until detecting another transition, and if the bit alignment check is successful, a bit boundary is established. The bit boundary is further confirmed by performing the bit alignment check a given number of times. Data bits in the received signal are extracted according to the confirmed bit boundary.

An exemplary embodiment of a system for bit synchronization boundary detection in a received signal comprises a transition detector, a counter, a processor, and a bit generator. The transition detector detects transitions in the received signal, and the counter periodically counts from 1 to M by incrementing the counter every PRN code period when the transition detector detects a first transition. The processor coupled to the transition detector and the counter checks bit alignment by comparing actual time of a subsequent-transition to expected time. In some embodiment, if the bit alignment check fails, the processor resets the counter, and starts counting from 1 until another transition is detected. In some other embodiments, the counter is not reset when the bit alignment check fails, but it will be set to 1 and restart counting at the next transition. The processor establishes a bit boundary if the bit alignment check is successful, and generates a confirmed bit boundary by performing the bit alignment check for a given number of times. The bit generator extracts data bits in the received signal according to the confirmed bit boundary output from the processor.

Some embodiments of the system further comprise a latch receiving the received signal and latching the polarity of the received signal at a previous expected time. The processor checks whether the polarity of the received signal at a current expected time is consistent with the polarity latched in the latch, and the bit alignment check fails if the two polarities are inconsistent.

An exemplary embodiment of a receiver comprises a carrier oscillator, a carrier mixer, a code generator, a code mixer, an accumulator, and a data extractor. The carrier mixer converts a received signal from Intermediate Frequency (IF) to baseband frequency by mixing the received signal with an IF carrier generated by the carrier oscillator. The code mixer mixes the received signal output from the carrier mixer with the code sequence generated by the code generator. The accumulator accumulates the output of the code-mixer over the duration of the code sequence and provides the accumulated result to the data extractor. The data extractor determines the bit boundary by detecting polarity transitions in the received signal, counting the duration between two successive transitions, and checking bit alignment based on the counted duration. The bit boundary is further confirmed by performing several bit alignment checks. The data extractor extracts data bits in the received signal according to the confirmed bit boundary.

DESCRIPTION OF THE DRAWINGS

The invention can be more fully understood by reading the subsequent detailed description in conjunction with the examples and references made to the accompanying drawings, wherein.

DETAILED DESCRIPTION

Figure 2:
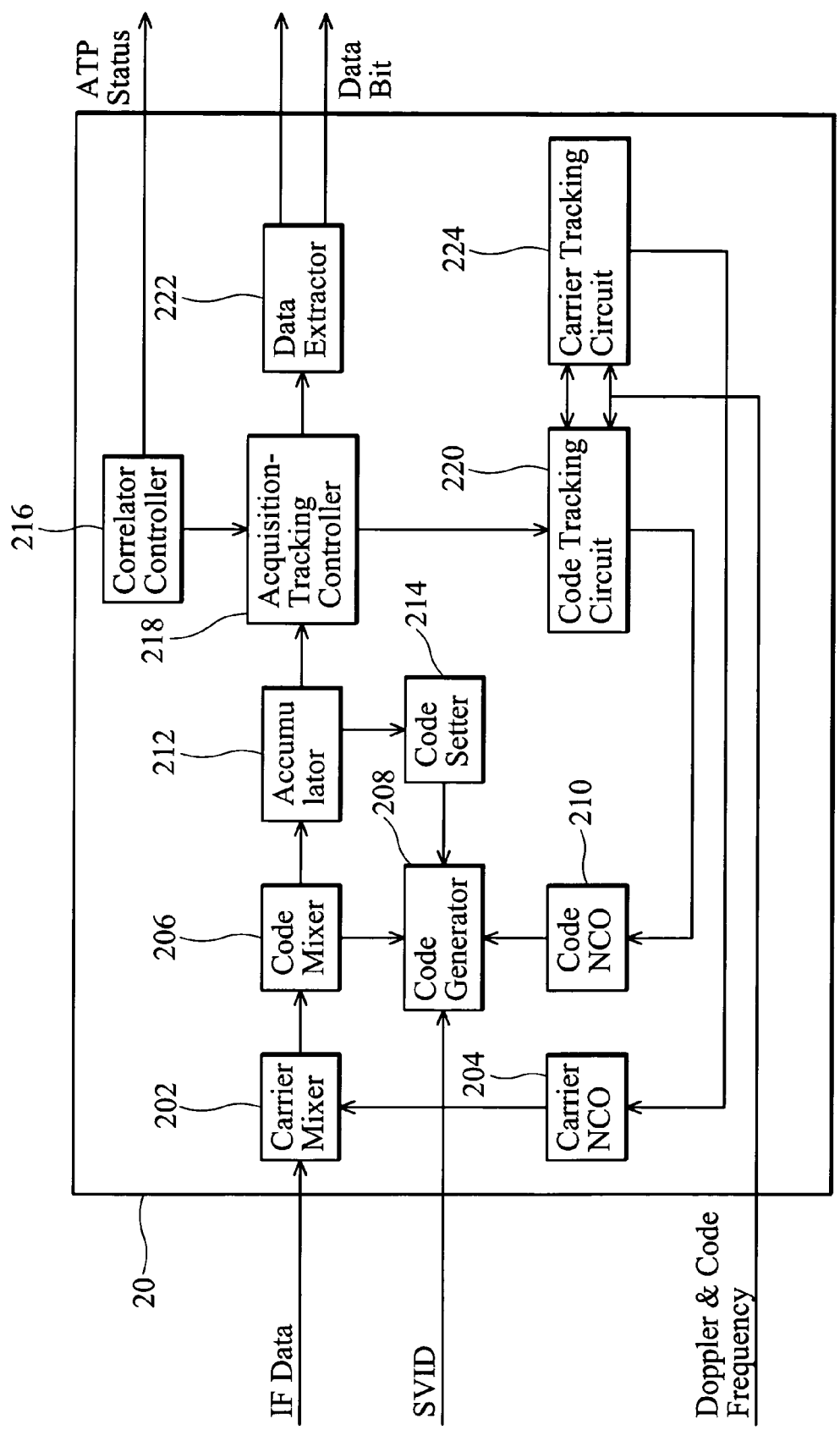
FIG. 2 shows a block diagram of an exemplary GPS receiver subsystem for down-converting, demodulating, and de-spreading Intermediate Frequency signals into data bits.

FIG. 2 shows a block diagram of an exemplary GPS receiver subsystem 20 for down-converting, demodulating, and de-spreading Intermediate Frequency (IF) signals into data bits. The GPS receiver receives signals from multiple GPS satellites and down-converts the signals from Radio Frequency (RF) band (1575.42 MHz) to IF band through an RF circuit (not shown). The IF signals are then provided to a baseband processor such as the GPS receiver subsystem 20 shown in FIG. 2. The GPS receiver subsystem 20 comprises a carrier Numerical Controlled Oscillator (NCO) 204, a carrier mixer 202, a carrier tracking circuit 224 for tracking and locking the carrier frequency, a code NCO 210, a code mixer 206, a code generator 208, a code setter 214, and a code tracking circuit 220 for tracking and locking a corresponding code sequence. The carrier mixer 202 mixes the received IF signals with a reference carrier generated by the carrier NCO 204. The reference carrier is phase shifted by 90 degrees and separately mixed with the received IF signals. The carrier mixer 202 generates two signals, one in phase with the reference carrier (signal I), and another in quadrature with the reference carrier (signal Q). The reference carrier frequency is adjusted by the carrier NCO 204 to match the carrier frequency of the received IF signals so that signals I and Q output from the carrier mixer 202 are down-converted to baseband frequency. Signals I and Q are provided to the code mixer 206 and correlated with a PRN code generated by the code generator 208. The code generator 208 is capable of generating various types of PRN codes, for example, C/A code for GPS signal acquisition, and each type is comprised of finite duration sequences. The purpose of the correlation process, also known as de-spreading, is to differentiate between the signal from one satellite and the signals from other satellites, and remove the PRN code modulation from the baseband signal.

The GPS receiver subsystem 20 further comprises an accumulator 212, an acquisition-tracking controller 218, a correlator controller 216, and a data extractor 222. The output of the code mixer 206 is accumulated over the duration of 1023-chip sequence, and a result is output to the acquisition-tracking controller 218 at the end of each sequence. The data extractor 122 obtains accumulated signals I and Q from the acquisition-tracking controller 218 and determines data bits by judging bit boundaries.

Figure 3:
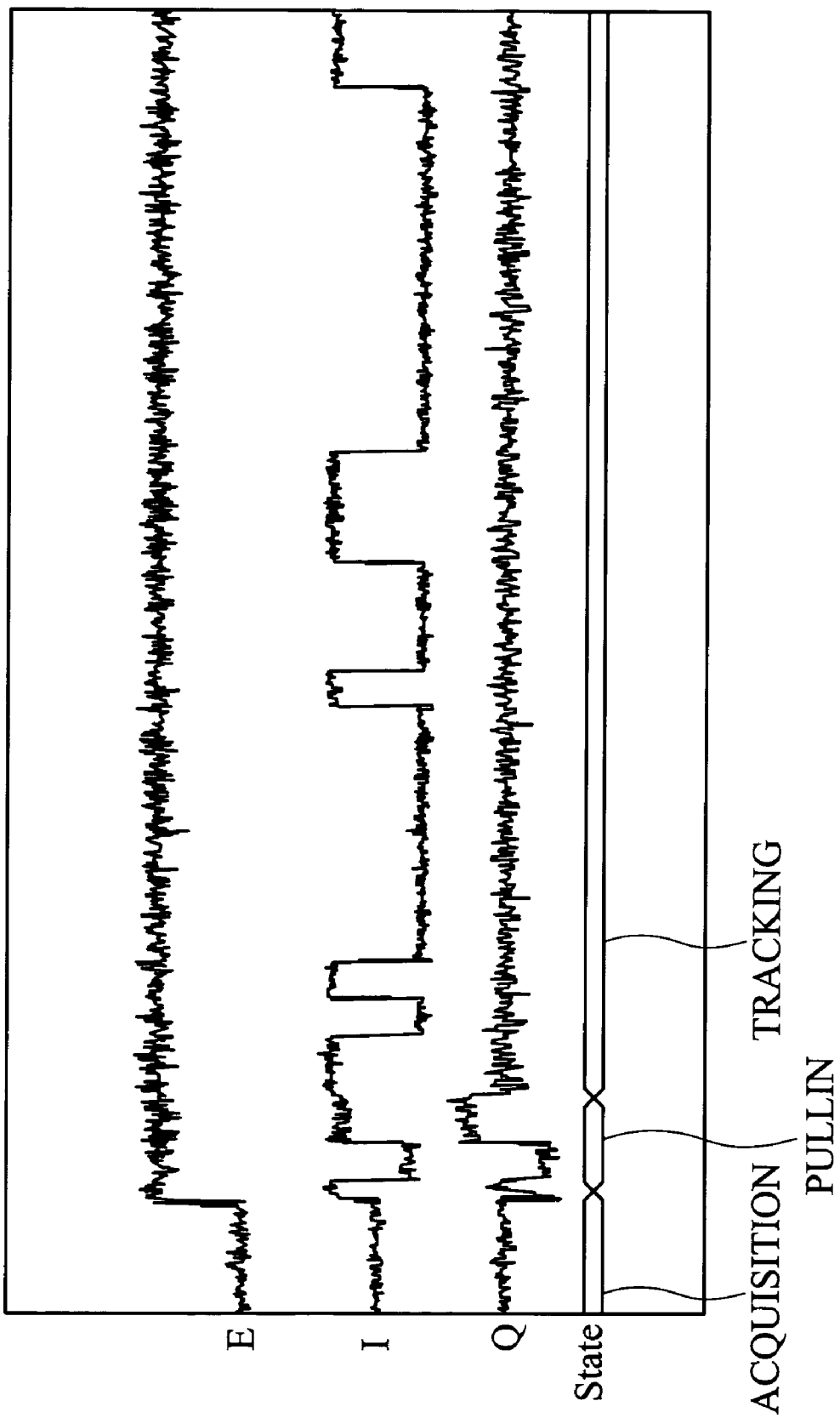
FIG. 3 is an exemplary waveform diagram illustrating the output accumulated signals I and Q from the accumulator, a root sum square E of the accumulated signals, and the corresponding state.

FIG. 3 is an exemplary waveform diagram illustrating the accumulated signals I and Q, where signal E is the root sum square of the accumulated signals I and Q. Signal E rises to a significant signal level with respect to the noise level when an approximate carrier frequency is found and an appropriate code sequence is acquired, which corresponds to the transition from ACQUISITION state to the PULLIN state in FIG. 3. In PULLIN state, the code tracking loop starts tracking the phase of the code clock generated from code NCO, and the carrier tracking loop starts tracking to a more accurate carrier frequency. An exemplary code tracking loop shown in FIG. 2 comprises the code mixer 206, the accumulator 212, the acquisition tracking controller 218, the code tracking circuit 220, the code NCO 210, and the code generator 208. Similarly, an exemplary carrier tracking loop shown in FIG. 2 comprises the carrier mixer 202, the accumulator 212, the acquisition-tracking controller 218, the carrier tracking circuit 224, and the carrier NCO 204. After a while, when the carrier frequency and phase of the code clock of the received signal are both locked by each tracking loop, it enters TRACKING state. After entering TRACKING state, the carrier tracking loop starts tracking the carrier phase, and signal Q is pulled to a low signal level since the energy of the received signal is concentrated on signal I.

GPS signals are typically modulated in Binary Phase Shift Keying (BPSK), thus the polarity of the locked signal I represents the symbol value with duration of 1 ms. Since each data bit is successively transmitted 20 times to be more robust and avoid various types of interference, the bit boundary occurs every 20 ms in the received GPS signal. The data extractor 222 of FIG. 2 extracts the GPS data bits by precisely distinguishing the 20 ms bit boundary.

An embodiment of a method for detecting bit synchronization boundary is illustrated with reference to the waveforms shown in FIG. 4. A counter K_CNT increases at every C/A code sequence 1 ms boundary (PRN code boundary) and periodically counts from 1 to M is introduced, and a bit boundary is expected at each time the counter reaches M (K_CNT=M) after successfully aligning with the received signal. M is 20 for GPS receiving systems as each GPS data bit is transmitted by twenty PRN code periods, whereas M is 2 for Wide Area Augmentation System (WAAS) receiving systems as each WAAS data bit is transmitted by two PRN code periods. The receiver begins detecting the bit boundary when the code and carrier tracking loops are locked, which corresponds to TRACKING state in FIG. 3.

Figure 4:
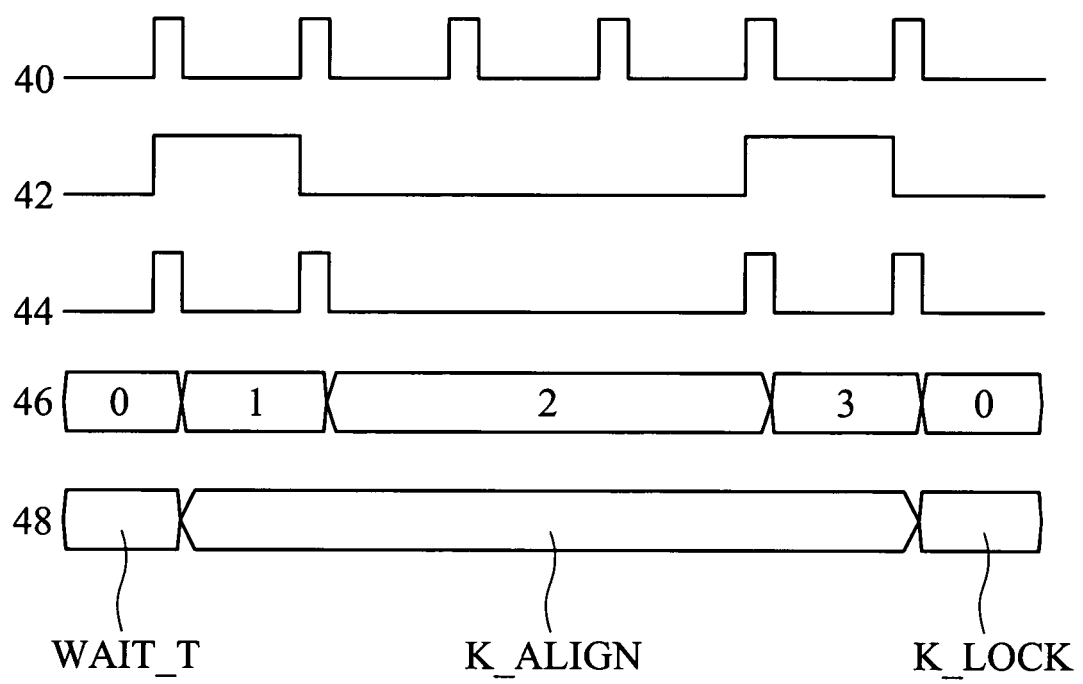
FIG. 4 shows exemplary waveforms illustrating a case in detection of bit synchronization boundary.

The following description related to FIG. 4 is for detecting bit synchronization boundary in a GPS system, where M is 20. The first waveform 40 in FIG. 4 pulls HIGH if K_CNT=M, and the second waveform 42 shows signal I after slicing or quantization. The receiver detects polarity transitions of signal I, and the third waveform 44 records every polarity transition of waveform 42. In some embodiments, the receiver begins detecting the bit boundary immediately after the code tracking loop acquires a corresponding code sequence and before the carrier tracking loop is locked. This corresponds to PULLIN state in FIG. 3, when signal Q is not yet kept at a low signal level. The receiver detects the phase inversions of the I-Q phasor of the received signal instead of the polarity transitions of signal I. In some embodiments, the phase inversions of the I-Q phasor of the received signal are detected by measuring phase changes of the received signal, and if the absolute value of a phase change of the I-Q phasor exceeds a predetermined threshold (for example, π), a phase inversion has occurred.

The counter K_CNT is set to 1 and starts counting from 1 to 20 periodically by incrementing the counter every PRN code boundary when a first transition (polarity transition or phase inversion) is detected. The fourth waveform 46 checks the validity of the detected bit boundary, which increases incrementally when waveforms 40 and 44 are aligned, indicating the transition occurs when the counter K_CNT reaches M. If the locked tracking loop becomes unlocked, the counter K_CNT is reset and paused until detection of the arrival of a next transition. In some embodiments, the counter K_CNT is not necessary to be reset at the time when the tracking loop is unlocked. The counter K_CNT restarts counting from 1 when a next transition is detected. The fifth waveform 48 shows the state of a finite state machine (FSM), where the FSM 48 changes from WAIT_T state to K_ALIGN state when the first transition is detected.

For every K_CNT=20, the receiver checks if a transition has occurred, for example, a second transition of waveform 42 occurs at the next K_CNT=20 as the falling edge of waveform 42 aligns with the rising edge of waveform 40. Waveform 46 is a check-counter which increases from 1 to 2 after detecting the second transition occurred at K_CNT=20. If no transition is detected at K_CNT=20, the current polarity of signal I is checked by comparing it with the previous polarity at the last K_CNT=20. If the polarity remains the same, there may be no transition at this bit boundary, and the receiver checks for the next K_CNT=20. If the polarity changes from high to low or low to high, a transition exists and has been missed, indicating that the current bit boundary is likely erroneous. A tolerance threshold can be set to allow the receiver to repeatedly check whether the subsequent transition is aligned with K_CNT=20, and the current bit boundary is determined as invalid when the number of missed transitions exceeds the tolerance threshold. The counter is then reset and paused until a next transition, and the FSM 48 returns to WAIT_T state and restarts the boundary detection process again. The validity of the bit boundary is confirmed according to the value counted by waveform 46, for example, if the algorithm states three successive transitions followed by the first transition are all aligned with K_CNT=20, the bit boundary is confirmed when the check-counter (waveform 46) reaches 3, causing the FSM 48 to enter K_LOCK state.

The confirmed bit boundary is used for extracting received data bit. At the same time, the receiver continues checking if each of the subsequent transitions is aligned with the confirmed bit boundary (at K_CNT=20). If no transition occurs at the confirmed bit boundary, the polarity of signal I is checked to make sure that there is no transition occurring between two successive bit boundaries. A transition occurred somewhere other than the bit boundary indicates that the current bit boundary might be erroneous. The receiver continues the same check, and records the number of transitions not aligned with the bit boundary. The confirmed bit boundary is invalid if the recorded number reaches a given threshold. Additionally, whenever one of the tracking loops is unlocked, the bit boundary is invalid and the receiver must search for and set a new bit boundary.

Figure 5:
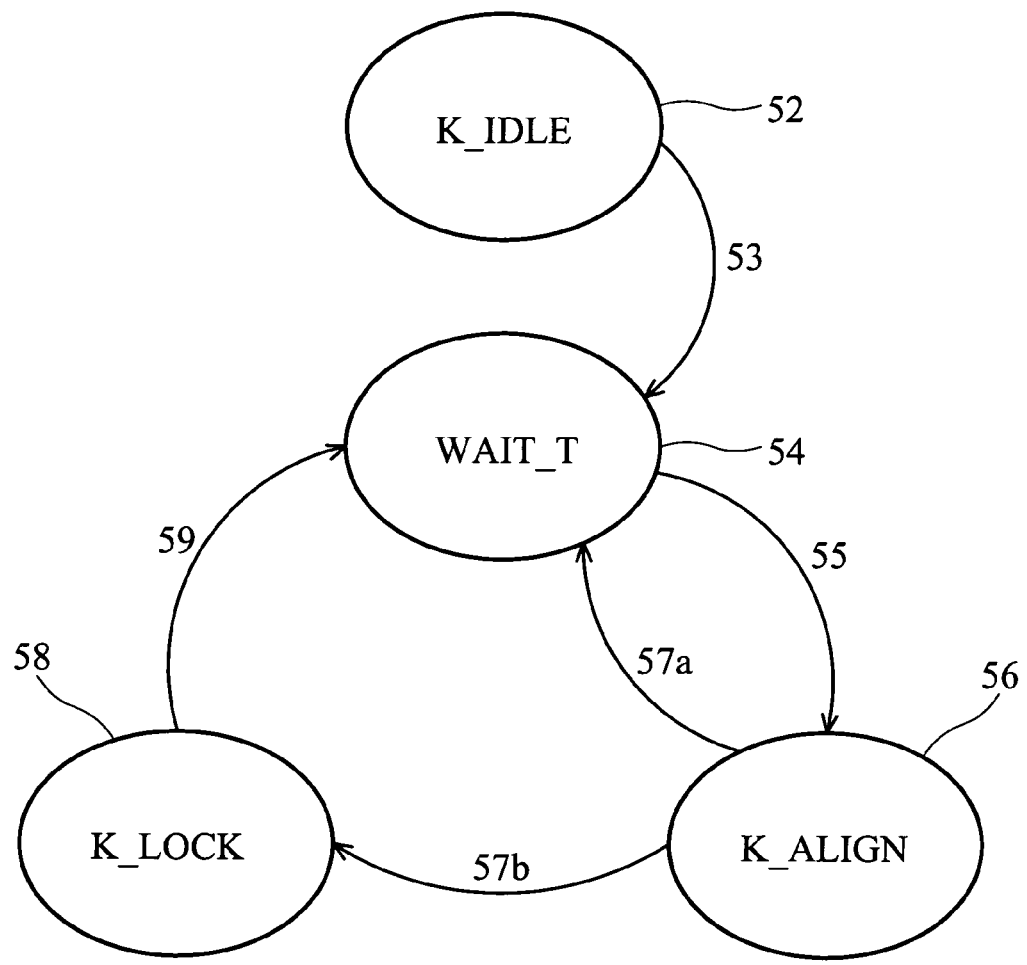
FIG. 5 is a state transition diagram for a finite state machine according to an embodiment of the bit boundary detection method.

FIG. 5 is a state transition diagram showing an embodiment of the finite state machine (FSM) for the bit synchronization detection method. The FSM is initially at K_IDLE state 52, and it enters WAIT_T state 54 when the tracking loops are locked 53. Detection of a first transition 55 in the received signal initiates transition from WAIT_T state 54 to K_ALIGN state 56. A bit boundary is established and continuously checked in K_ALIGN state 56. The receiver checks whether the transitions are aligned with the established bit boundary, and it returns to WAIT_T state 54 if the alignment check fails 57a. After a predetermined number of successful alignment checks 57b, the FSM transits from K_ALIGN state 56 to K_LOCK state 58 and the bit boundary is confirmed. The receiver may start extracting data bits from the received signal according to the confirmed bit boundary at K_LOCK state 58. The receiver continues checking the validity of the confirmed bit boundary at K_LOCK state 58 by detecting any transition occurs anywhere other than the confirmed bit boundary, and enters WAIT_T state 54 if the confirmed bit boundary is invalid (lock failed) 59.

Figure 6:
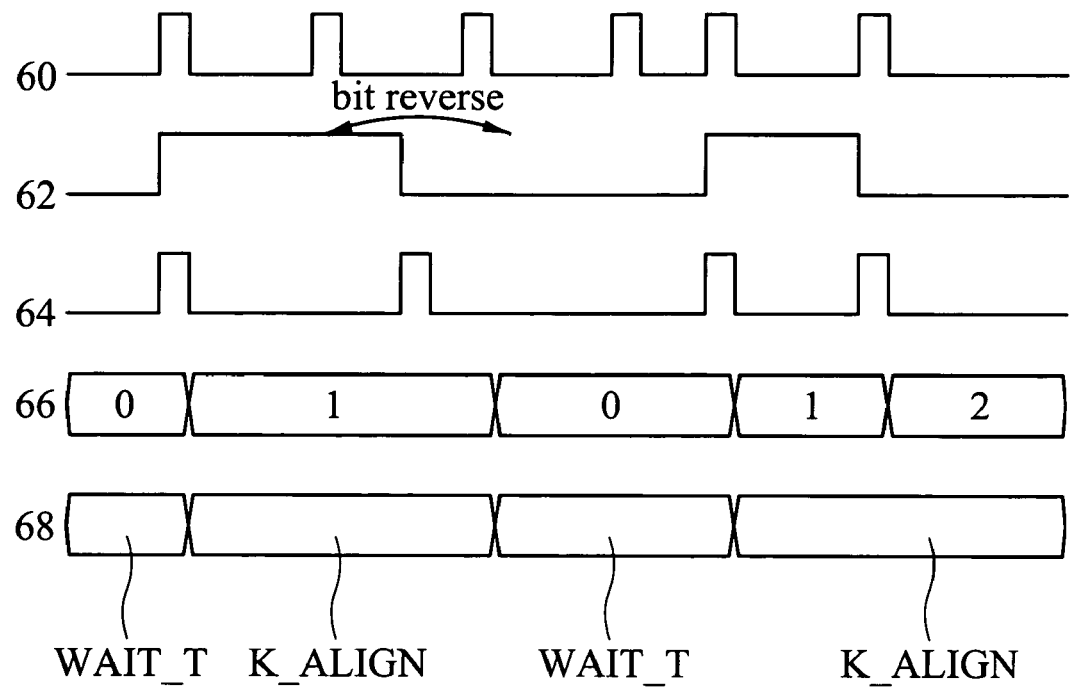
FIG. 6 shows exemplary waveforms illustrating another case in detection of bit synchronization boundary.

FIG. 6 shows a case when an erroneous counter (K_CNT) is established at the first alignment. The definition of individual waveform in FIG. 6 is identical to the corresponding waveform in FIG. 4, and for purpose of consistency, the following description refers to a GPS receiving system with M=20. The first waveform 60 pulls HIGH when K_CNT=20, and the second waveform 62 shows a binary received signal. The third waveform 64 records the transitions detected in waveform 62. A check-counter 66 counts from 0 to 1 after detecting a first transition, where K_CNT=20 (bit boundary) is set to be aligned with the first transition. The FSM 68 changes its state from WAIT_T to K_ALIGN. No transition is found at the subsequent bit boundaries (K_CNT=20), as the transition has occurred between two bit boundaries. A bit reverse in waveform 62 is detected by comparing the polarity at current and previous K_CNT=20, and bit reverse indicates that the bit boundary previously set may not be appropriate. The check-counter 66 is thus reset to 0, and the FSM 68 goes back to WAIT_T. The check-counter 66 increases and the FSM 68 enters $K_{13}$ ALGIN state again when another transition is detected.

Figure 1:
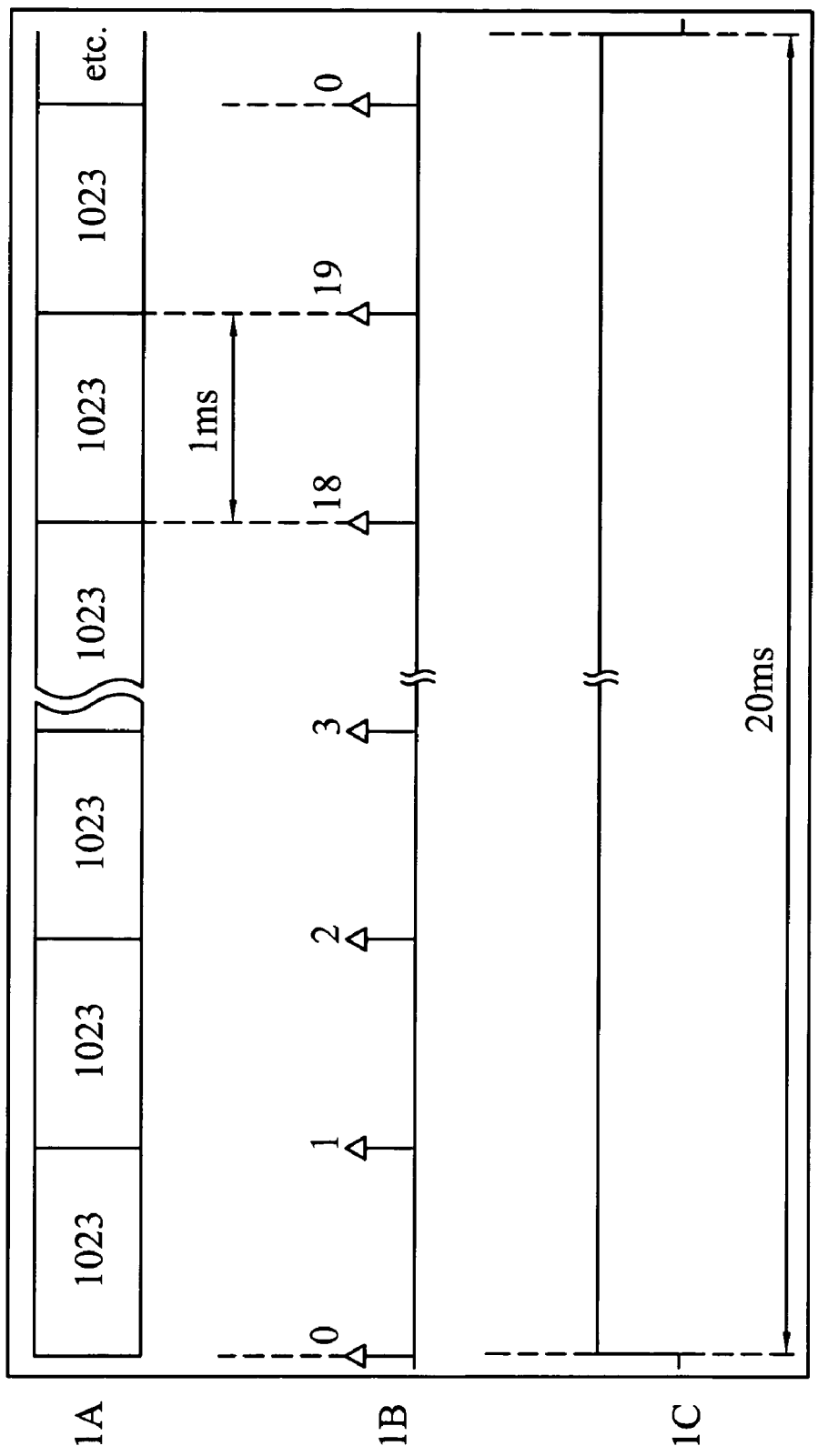
FIG. 1 illustrates the standard transmission of a GPS data bit.
Figure 7:
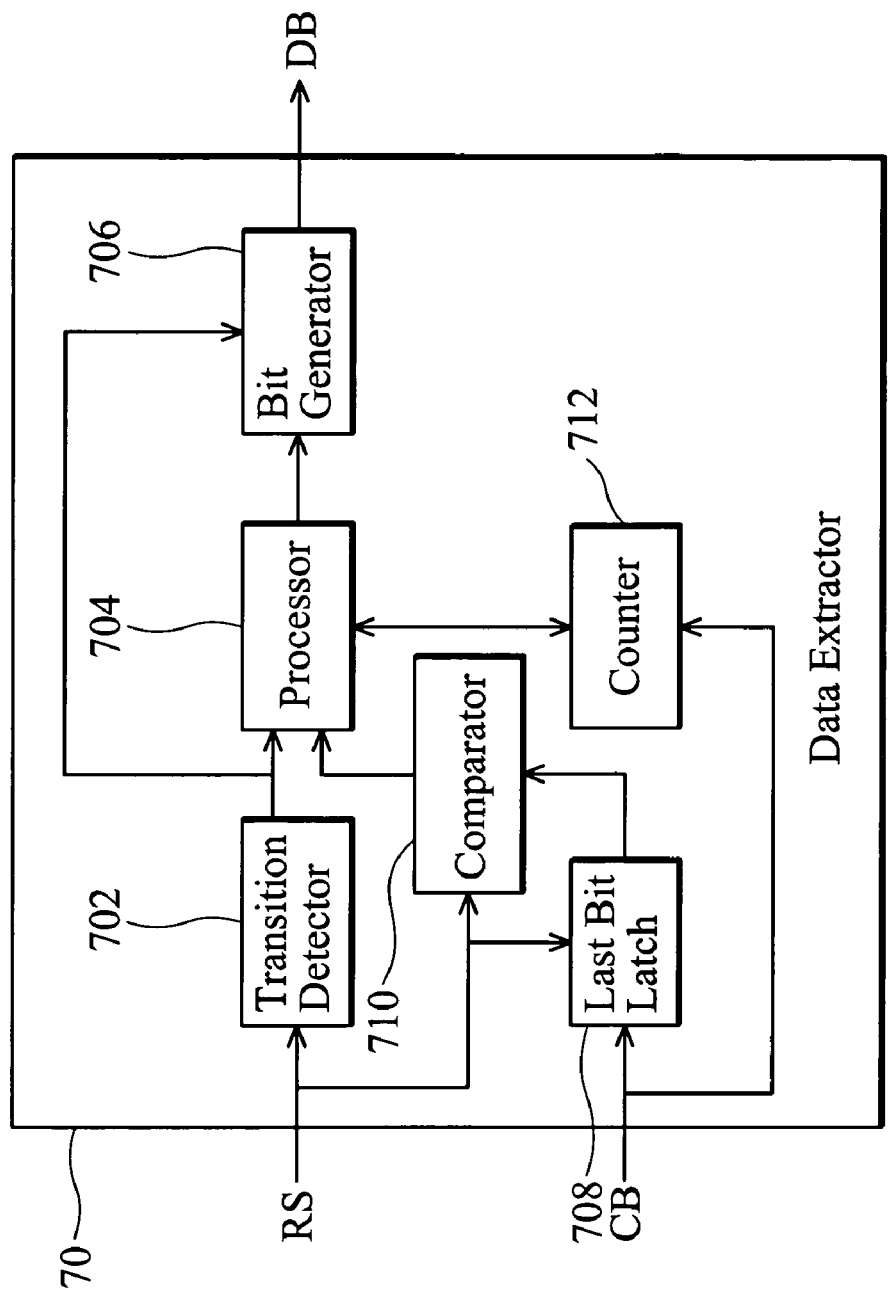
FIG. 7 is a block diagram showing an embodiment of the data extractor.

FIG. 7 shows an embodiment of a data extractor 70 for detecting the bit boundary in a received signal and extracting data bits according to the bit boundary. The data extractor 70 comprises a transition detector 702, a counter 712, a processor 704, a bit generator 706, a last bit latch 708, and a comparator 710. The transition detector 702 receives an integration result carried by a received signal RS and detects transitions therein. A signal at 1000 Hz indicating 1 ms code boundaries CB (such as the illustration about label "1B" in FIG. 1) is provided to the last bit latch 708 and the counter 712 for clock reference. The counter 712 periodically counts from 1 to M (for example, M=20 for GPS and M=2 for WAAS) at every 1 ms code boundary CB after detection of a first transition by the transition detector 702. The processor 704 checks bit alignment by comparing actual time of a subsequent transition to expected time, where the expect time is determined by the counter 712, and in some embodiments, the expected time is when counter 712 reaches M. If the alignment fails, the processor 704 may reset the counter 712 and make the counter 712 remains idle. The counter 712 is then set to 1 and begins counting from 1 to M when the transition detector 702 detects another transition. In some other embodiments, the counter 712 may be set to 1 at the next transition without reset at the time of detecting alignment failure. The processor 704 establishes a bit boundary if the bit alignment check is successful, generates a confirmed bit boundary by performing the bit alignment check for X times (X=3 in the example shown in FIG. 3). Consequently, the bit generator 706 extracts data bits DB according to the confirmed bit boundary output from the processor 704. The last bit latch 708 latches the polarity of the last bit, which is the polarity at the last time the counter counts to M. The comparator 710 compares the polarity of current bit received from the input RS and last bit latched in the last bit latch 708, and notifies the processor 704 if the polarity of these two successive bits is different. The processor 704 fails the bit alignment check when receiving the polarity inconsistence notification from the comparator 710.

While the invention has been described by way of example and in terms of preferred embodiment, it is to be understood that the invention is not limited thereto. On the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A method for detecting bit synchronization boundary in a received signal, comprising:
   detecting transitions in the received signal;
   initiating a counter periodically counting from 1 to M when detecting a first transition, wherein M is a positive integer;
   checking bit alignment by comparing actual time of a subsequent transition to expected time, wherein the expected time is determined according to the counter;
   when the bit alignment check fails, restart counting the counter until detecting another transition;
   establishing a bit boundary if the bit alignment check is successful;
   confirming the bit boundary by repeatedly performing the bit alignment check for a predetermined number of times; and
   extracting data bits in the received signal in accordance with the confirmed bit boundary.

2. The method for bit synchronization boundary detection according to claim 1, further comprising:
   continuously performing the bit alignment check while extracting the data bits in the received signal; and
   invalidating the confirmed bit boundary, restart counting the counter until detecting another transition if the bit alignment check fails for a second preset number of times.

3. The method for bit synchronization boundary detection according to claim 1, further comprising:
   checking whether code tracking is locked; and
   restart counting the counter until detecting another transition if the code tracking is unlocked.

4. The method for bit synchronization boundary detection according to claim 1, wherein the transitions in the received signal are determined by observing phase inversions in the received signal.

5. The method for bit synchronization boundary detection according to claim 1, further comprising:
   checking whether carrier tracking is locked; and
   restart counting the counter until detecting another transition if the code tracking is unlocked.

6. The method for bit synchronization boundary detection according to claim 1, wherein the transitions in the received signal are determined by observing the polarity of the received signal.

7. The method for bit synchronization boundary detection according to claim 1, wherein the expected time is when the counter counts to M.

8. The method for bit synchronization boundary detection according to claim 1, wherein checking bit alignment comprises:
   checking whether the polarity of the received signal at current expected time is consistent with previous expected time; and
   failing the bit alignment check if the polarities are inconsistent.

9. The method for bit synchronization boundary detection according to claim 1, wherein the duration of each data bit in the received signal is M times the counting rate of the counter.

10. A system for bit synchronization boundary detection in a received signal, comprising:
    a transition detector, detecting transitions in the received signal;
    a counter, periodically counting from 1 to M when the transition detector detects a first transition, wherein M is a positive integer;
    a processor coupled to the transition detector and the counter, checking bit alignment by comparing actual time of a subsequent transition to expected time, establishing a bit boundary if the bit alignment check is success, and generating a confirmed bit boundary by performing the bit alignment check for a predetermined number of times; and
    a bit generator coupled to the processor, extracting data bits in the received signal according to the confirmed bit boundary output from the processor;
    wherein the processor determines the expected time according to the counter output, and if the bit alignment check fails, the counter restarts counting from 1 until detecting another transition.

11. The system for bit synchronization boundary detection according to claim 10, wherein the processor continuously performs the bit alignment check while extracting the data bits in the received signal, and if the bit alignment check fails for a second preset number of times, the processor invalidates the confirmed bit boundary, and the counter restarts counting from 1 until detecting another transition.

12. The system for bit synchronization boundary detection according to claim 10, wherein the processor resets the counter if code tracking is unlocked, and the counter starts counting from 1 until detecting another transition.

13. The system for bit synchronization boundary detection according to claim 10, wherein the transition detector determines the transitions in the received signal by observing phase inversions in the received signal.

14. The system for bit synchronization boundary detection according to claim 10, wherein the processor resets the counter if carrier tracking is unlocked, and the counter starts counting from 1 until detecting another transition.

15. The system for bit synchronization boundary detection according to claim 10, wherein the transition detector determines the transitions in the received signal by observing the polarity of the received signal.

16. The system for bit synchronization boundary detection according to claim 10, wherein the expected time is when the counter counts to M.

17. The system for bit synchronization boundary detection according to claim 10, further comprising:
    a latch coupled to the processor, receiving the received signal and latching the polarity of the received signal at previous expected time;
    wherein the processor checks whether the polarity of the received signal at current expected time is consistent with the polarity latched in the latch, and fails the bit alignment check if the polarities are inconsistent.

18. A receiver for extracting data bits in a received signal, comprising:
    a carrier oscillator, generating a carrier frequency;
    a carrier mixer, converting the received signal from intermediate frequency (IF) to baseband frequency by mixing the received signal with the carrier frequency;
    a code generator, generating a code sequence;
    a code mixer, de-spreading the received signal output from the carrier mixer according to the code sequence;
    an accumulator, accumulating the received signal output from the code mixer over the duration of the code sequence; and
    a data extractor coupled to the output of the accumulator, detecting transitions in the received signal, establishing a bit boundary by counting the duration between two successive transitions and checking if the counted duration is valid, confirming the bit boundary by performing the bit alignment check for a predetermined number of times, and extracting the data bits in the received signal according to the confirmed bit boundary.

19. The receiver for extracting data bits according to claim 18, further comprising:
a tracking circuit coupled to the accumulator and the data extractor, checking the status of code tracking or carrier tracking, and notifying the data extractor if any of the code or carrier tracking is unlocked;
wherein the data extractor invalidates the bit boundary and re-establishes a bit boundary if any of the code or carrier tracking is unlock.

20. receiver for extracting data bits according to claim 18, wherein the data extractor continuously confirms the bit boundary while extracting the data bits in the received signal, and if the duration between two successive transitions is invalid for a second predetermined number of times, the data extractor invalidates the confirmed bit boundary and re-establishes a bit boundary.

21. The receiver for extracting data bits according to claim 18, wherein the data extractor determines the transitions in the received signal by observing phase inversions in the received signal.

22. The receiver for extracting data bits according to claim 18, wherein the data extractor determines the transitions in the received signal by observing the polarity of the received signal.

23. The receiver for extracting data bits according to claim 18, wherein the data extractor latches the polarity of the received signal at previous expected time, checks whether the polarity of the received signal at current expected time is consistent with the latched polarity, and invalidates the bit boundary if the polarities are inconsistent.

* * * * *